(12) United States Patent
Ortega

(10) Patent No.: US 7,784,135 B2
(45) Date of Patent: Aug. 31, 2010

(54) TOOL FOR BRUSHING CIRCUMFERENTIAL WELDS IN RESTRICTED ACCESS AREAS

(75) Inventor: Frank Ortega, San Jose, CA (US)

(73) Assignee: General Electric Company, Schenectady, NY (US)

( * ) Notice: Subject to any disclaimer, the term of this patent is extended or adjusted under 35 U.S.C. 154(b) by 926 days.

(21) Appl. No.: 11/639,337

(22) Filed: Dec. 15, 2006

(65) Prior Publication Data
US 2008/0165911 A1    Jul. 10, 2008

(51) Int. Cl.
*A46B 13/02* (2006.01)

(52) U.S. Cl. .......................... 15/21.1; 15/88; 15/104.04; 376/249; 376/252

(58) Field of Classification Search .................. 15/3, 15/21.1, 88, 88.2–88.4, 246; 29/723; 451/27, 451/28, 51, 59, 61; *A46B 13/02; G21C 13/032*
See application file for complete search history.

(56) References Cited

U.S. PATENT DOCUMENTS

| 2,823,398 | A | * | 2/1958 | Curran ..................... 15/104.04 |
| 4,744,251 | A | * | 5/1988 | Shirasu et al. ................. 73/622 |
| 5,784,425 | A | * | 7/1998 | Morlan ........................ 376/249 |
| 6,137,853 | A | * | 10/2000 | Duckering et al. .......... 376/252 |
| 6,669,533 | B2 | * | 12/2003 | Huboud-Peron ............. 451/11 |
| 7,076,017 | B2 | | 7/2006 | Offer et al. |

* cited by examiner

*Primary Examiner*—Monica S Carter
*Assistant Examiner*—Stephanie Newton
(74) *Attorney, Agent, or Firm*—Nixon & Vanderhye P.C.

(57) ABSTRACT

A tool assembly provides for brushing circumferential welds in a restrictive access area between a cylindrical inner member and a cylindrical outer member such as the shroud and vessel in a nuclear reactor. The tool assembly includes a circumferential plate sized larger than an outside diameter of the inner member and smaller than an inside diameter of the outer member. At least one renew brush is coupled with the circumferential plate, and a motor is coupled with the renew brush that rotates the renew brush. A driving assembly mounted between the inner member and the outer member engages the circumferential plate and circumferentially drives the circumferential plate in the restrictive access area.

12 Claims, 4 Drawing Sheets

TOOL FOR BRUSHING CIRCUMFERENTIAL WELDS IN RESTRICTED ACCESS AREAS

BACKGROUND OF THE INVENTION

The invention relates to a tool and process for mechanical surface conditioning of metals and, more particularly, to a tool and process for mechanical surface conditioning of metals to mitigate susceptibility to crack initiation or growth of small cracks due to tensile surface stresses.

Tensile stresses can be found in the welds and heat affected zones of a nuclear reactor. Previous attempts have addressed surface conditioning of such welds when jet pumps have been removed, such as when the reactor internals have been removed and replaced including the jet pumps. Without the internal components removed, however, it is difficult to access welds in the shroud outside diameter and vessel inside diameter between the jet pumps. To the inventor's knowledge, no other product exists that can access these welds to apply a renew process.

BRIEF DESCRIPTION OF THE INVENTION

In an exemplary embodiment of the invention, a tool assembly provides for brushing circumferential welds in a restrictive access area between a cylindrical inner member and a cylindrical outer member. The tool assembly includes a circumferential plate sized larger than an outside diameter of the inner member and smaller than an inside diameter of the outer member. At least one renew brush is coupled with the circumferential plate, and a motor is coupled with the renew brush that rotates the renew brush. A driving assembly mounted between the inner member and the outer member engages the circumferential plate and circumferentially drives the circumferential plate in the restrictive access area.

In another exemplary embodiment of the invention, a method of surface conditioning a cylindrical metal structure to mitigate susceptibility to crack initiation or growth on a weld due to tensile surface stresses includes the steps of providing a circumferential plate sized to fit adjacent one of an outside diameter of the cylindrical metal structure or an inside diameter of the cylindrical metal structure; coupling at least one renew brush with the circumferential plate; and rotating the renew brush while circumferentially driving the circumferential plate.

In yet another exemplary embodiment of the invention, a tool assembly provides for brushing circumferential welds in an annulus between a vessel inside diameter and a shroud outside diameter in a nuclear reactor. The tool assembly includes a circumferential plate sized larger than the shroud outside diameter smaller than the vessel inside diameter; at least one renew brush coupled with the circumferential plate; a motor coupled with the renew brush and rotating the renew brush; and a driving assembly mounted between the shroud and the vessel and engaging the circumferential plate, where the driving assembly circumferentially drives the circumferential plate and thereby the at least one renew brush in the annulus.

DETAILED DESCRIPTION OF THE INVENTION

Figure 1:
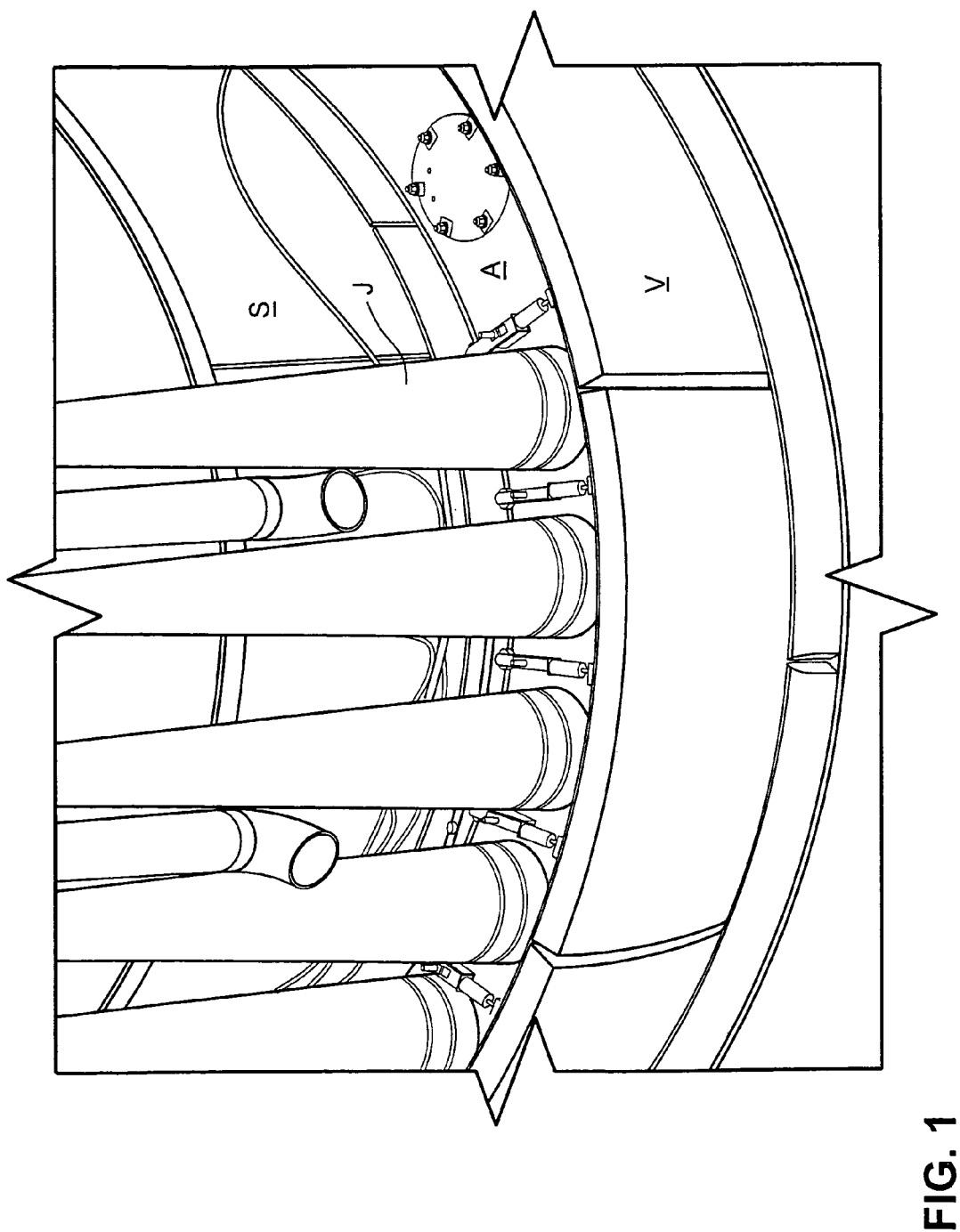
FIG. 1 illustrates the restricted access area in the annulus between a shroud and a vessel in a nuclear reactor.

With reference to the FIGURES, the tool assembly and method described herein allow access to the reduced space annulus, or restrictive access area, between the jet pumps, the shroud outside diameter and the vessel inside diameter in a nuclear reactor. As shown in FIG. 1, an area A between the reactor shroud S and vessel V is a restrictive access area, particularly with the jet pumps J in place. A renew process for mechanical surface conditioning of metals has been shown to mitigate susceptibility to crack initiation or growth of small cracks due to tensile surface stresses found in the welds and heat affected zones of the reactor. As noted above, however, it has been difficult to provide a tool to perform any renew procedures due to the restrictive access area in the annulus between the reactor shroud and vessel.

Figure 2:
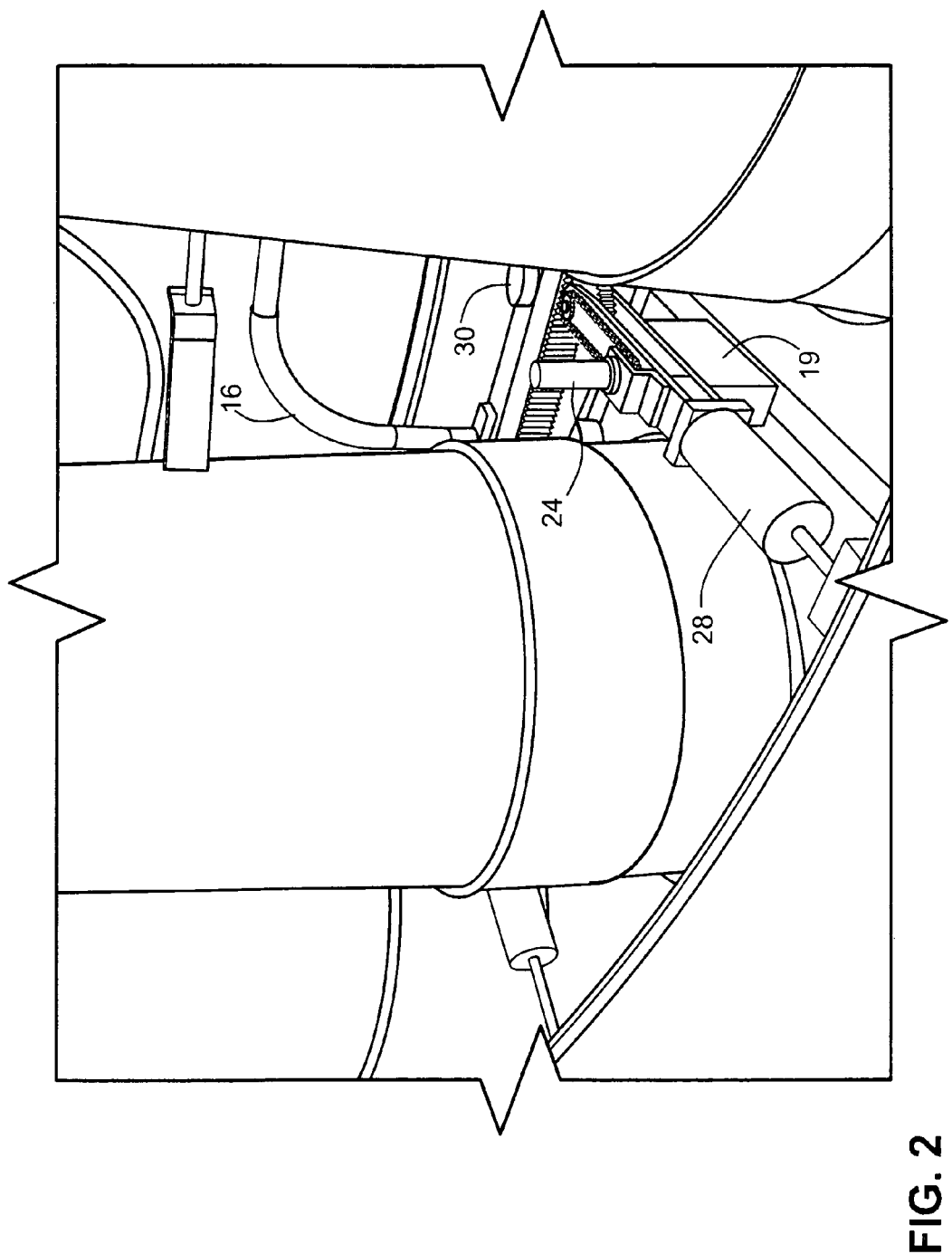
FIGS. 2 and 3 are perspective views showing the tool assembly described herein.
Figure 3:
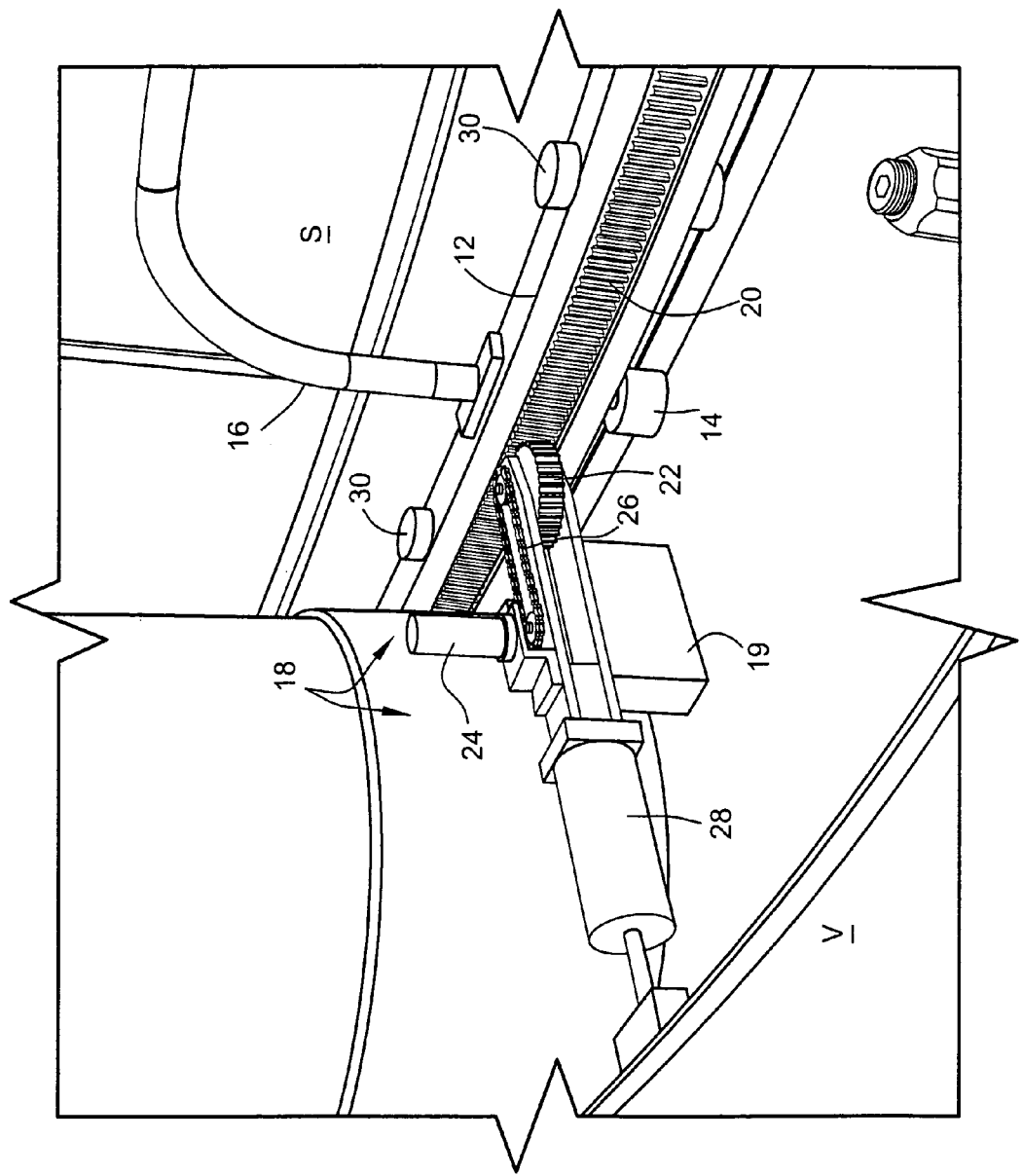
Figure 4:
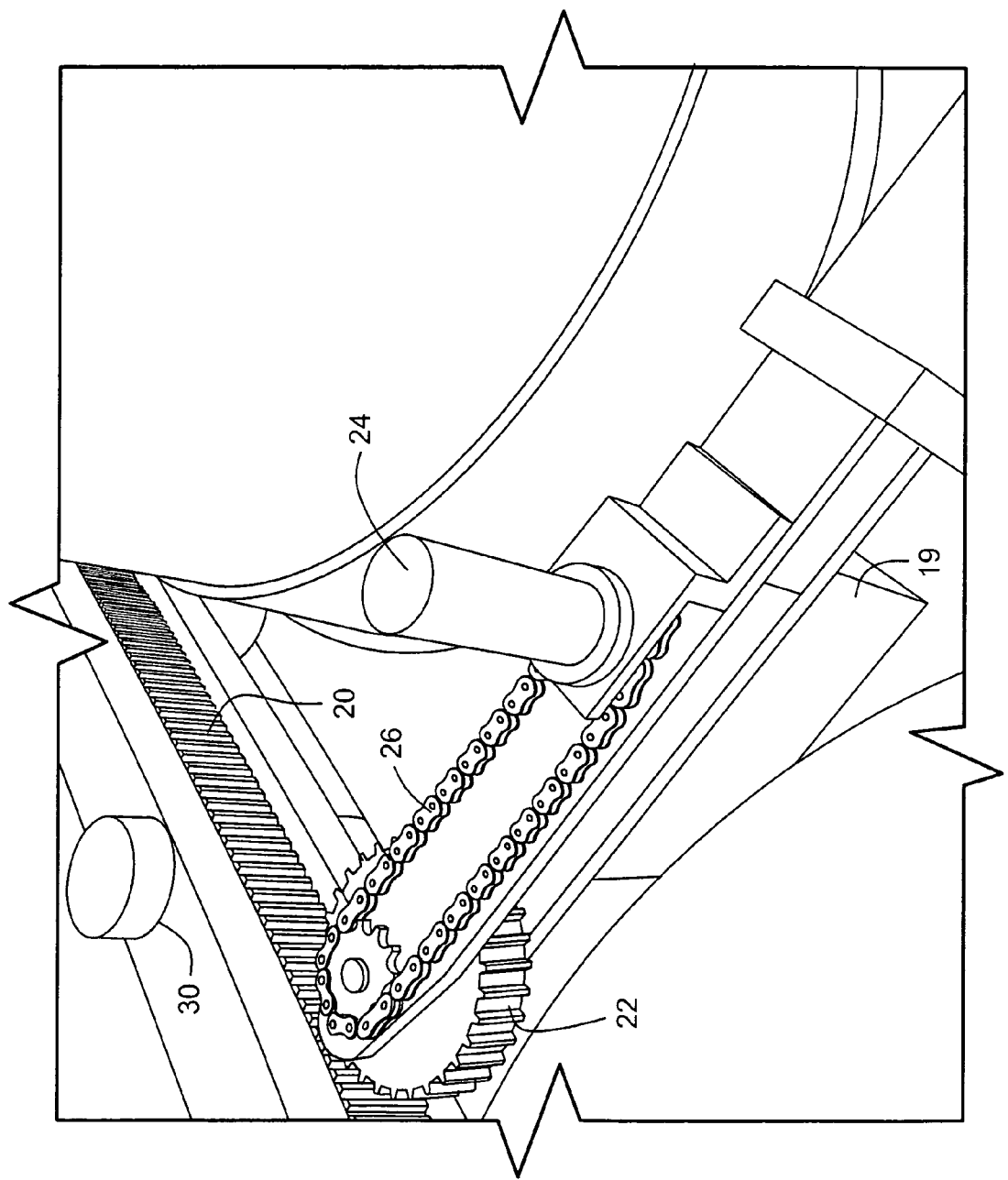
FIG. 4 shows an exemplary driving assembly for the tool assembly described herein.

With reference to FIGS. 2 and 3, the tool assembly includes a circumferential plate 12 sized larger than an outside diameter of the shroud S and smaller than an inside diameter of the vessel V. At least one renew brush 14 is coupled with the circumferential plate 12. A motor such as a hydraulic motor or the like is connected to the renew brush 14 via a flex drive cable 16 to selectively rotate the renew brush 14.

A driving assembly 18 is mounted on a positioning block 19 or the like between the reactor shroud S and the vessel V and engages the circumferential plate 12. In use, the driving assembly 18 serves to circumferentially drive the circumferential plate 12 in the restrictive access area.

As shown, the thickness of the circumferential plate 12 is small enough that it will fit in the restrictive access area. The plate 12 includes a circumferential rack 20, and the driving assembly 18 includes a corresponding pinion 22 that engages and drives the circumferential rack 20. A motor 24 is coupled with the pinion 22 via a driving belt such as a chain 26 or the like. A push cylinder 28 secures the engagement between the rack 20 and the pinion 22. Preferably, the tool assembly includes a plurality of drive assemblies 18 independently mounted between the reactor shroud and vessel and interposed between the jet pumps as shown.

It should be noted that although the drawings illustrate the circumferential plate 12 disposed surrounding the reactor shroud S with the push cylinder 28 acting against the reactor vessel, the tool assembly is equally suited to perform a renew process on a weld adjacent the reactor vessel V with the tool assembly components in a mirrored orientation. The invention is thus not necessarily meant to be limited to the illustrated exemplary application.

In use, as the circumferential plate 12 is driven by the driving assemblies 18, the renew brush 14 is moved circumferentially across the weld while being rotated to perform surface conditioning. The plate 12 may also be provided with a series of rollers 30 that allow the plate 12 to more smoothly ride on the shroud surface and/or vessel surface.

The tool assembly and method described herein provide for surface conditioning of welds in restrictive access areas to mitigate susceptibility to crack initiation or growth of small cracks due to tensile surface stresses. The assembly and method provide controlled positioning of a renew brush to perform surface conditioning about a circumferential weld.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A tool assembly for brushing circumferential welds in a restrictive access area between a cylindrical inner member and a cylindrical outer member, the tool assembly comprising:
    a circumferential plate sized larger than an outside diameter of the inner member and smaller than an inside diameter of the outer member;
    at least one renew brush coupled with the circumferential plate;
    a motor coupled with the renew brush and rotating the renew brush; and
    a driving assembly securable between the inner member and the outer member and engaging the circumferential plate, the driving assembly circumferentially driving the circumferential plate in the restrictive access area relative to the driving assembly.

2. A tool assembly according to claim 1, wherein the circumferential plate comprises rollers engageable with one of the inner member or the outer member.

3. A tool assembly according to claim 1, wherein the circumferential plate comprises a circumferential rack, and wherein the driving assembly comprises a pinion engageable with the circumferential rack.

4. A tool assembly according to claim 3, wherein the driving assembly further comprises a motor coupled with the pinion for driving the pinion.

5. A tool assembly according to claim 4, wherein the driving assembly motor is coupled with a driving belt, and wherein the driving belt is connected to a driving gear which in turn is connected with the pinion for transferring motive power from the motor to the pinion.

6. A tool assembly according to claim 5, wherein the driving belt is a chain.

7. A tool assembly according to claim 3, wherein the driving assembly comprises a plurality of pinions disposed about the restrictive access between the inner member and the outer member.

8. A tool assembly for brushing circumferential welds in a restrictive access area between a cylindrical inner member and a cylindrical outer member, the tool assembly comprising:
    a circumferential plate sized larger than an outside diameter of the inner member and smaller than an inside diameter of the outer member;
    at least one renew brush coupled with the circumferential plate;
    a motor coupled with the renew brush and rotating the renew brush; and
    a driving assembly mounted between the inner member and the outer member and engaging the circumferential plate, the driving assembly circumferentially driving the circumferential plate in the restrictive access area, wherein the circumferential plate comprises a circumferential rack, and wherein the driving assembly comprises a pinion engageable with the circumferential rack, wherein the circumferential plate is sized to surround the inner member, and wherein the driving assembly comprises a push cylinder disposed between the outer member and the pinion.

9. A tool assembly according to claim 1, comprising a plurality of driving assemblies spaced about a periphery of the inner member.

10. A tool assembly according to claim 9, wherein the circumferential plate comprises a circumferential rack, and wherein the driving assemblies each comprises a pinion engageable with the circumferential rack.

11. A method of surface conditioning a cylindrical metal structure to mitigate susceptibility to crack initiation or growth on a weld due to tensile surface stresses, the method comprising:
    providing a circumferential plate sized to fit adjacent one of an outside diameter of the cylindrical metal structure or an inside diameter of the cylindrical metal structure;
    coupling at least one renew brush with the circumferential plate;
    providing a driving assembly in engagement with the circumferential plate; and
    rotating the renew brush while circumferentially driving the circumferential plate with the driving assembly and relative to the driving assembly.

12. A tool assembly for brushing circumferential welds in an annulus between a vessel inside diameter and a shroud outside diameter in a nuclear reactor, the tool assembly comprising:
    a circumferential plate sized larger than the shroud outside diameter smaller than the vessel inside diameter;
    at least one renew brush coupled with the circumferential plate;
    a motor coupled with the renew brush and rotating the renew brush; and
    a driving assembly securable between the shroud and the vessel and engaging the circumferential plate, the driving assembly circumferentially driving the circumferential plate and thereby the at least one renew brush in the annulus relative to the driving assembly.

* * * * *